(12) United States Patent
Mitarai

(10) Patent No.: US 10,802,271 B2
(45) Date of Patent: *Oct. 13, 2020

(54) LENS DEVICE

(71) Applicant: FUJIFILM Corporation, Tokyo (JP)

(72) Inventor: Tsuyoshi Mitarai, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 123 days.

This patent is subject to a terminal disclaimer.

(21) Appl. No.: 16/179,381

(22) Filed: Nov. 2, 2018

(65) Prior Publication Data

US 2019/0072760 A1  Mar. 7, 2019

Related U.S. Application Data

(60) Division of application No. 15/430,140, filed on Feb. 10, 2017, now Pat. No. 10,151,919, which is a
(Continued)

(30) Foreign Application Priority Data

Sep. 29, 2014 (JP) .................. 2014-198243

(51) Int. Cl.
*G02B 27/00* (2006.01)
*G02B 7/04* (2006.01)
(Continued)

(52) U.S. Cl.
CPC ........... *G02B 27/0006* (2013.01); *G02B 7/04* (2013.01); *G02B 7/08* (2013.01); *G03B 3/10* (2013.01);
(Continued)

(58) Field of Classification Search
CPC ... G02B 7/04; G02B 7/09; G02B 7/10; G02B 7/102; G02B 7/105; G02B 27/0006;
(Continued)

(56) References Cited

U.S. PATENT DOCUMENTS 5,289,318 A * 2/1994 Sekine ............... G02B 7/08
359/813
5,758,206 A 5/1998 Imaoka
(Continued)

FOREIGN PATENT DOCUMENTS

CN 102789036 A 11/2012
JP S57-132170 A 8/1982
(Continued)

OTHER PUBLICATIONS

International Search Report issued in PCT/JP2015/062639; dated Aug. 4, 2015.
(Continued)

*Primary Examiner* — Marin Pichler
(74) *Attorney, Agent, or Firm* — Studebaker & Brackett PC

(57) ABSTRACT

There is provided a lens device that prevents dust from entering a space in which a movable lens is moved. A movable lens is moved in the direction of an optical axis. A holding member, which extends in the direction of the optical axis, is formed at an end portion of the movable lens. A magnet is fixed to an end portion of the holding member. A hall IC is disposed in a closed storage space at a position facing the magnet. A signal, which corresponds to the position of the magnet in the direction of the optical axis, is output from the hall IC. Since the hall IC is disposed in the storage space closed by a storage box, the entry of dust, which is caused by the hall IC, into a space in which the movable lens is moved is prevented.

16 Claims, 9 Drawing Sheets

Related U.S. Application Data continuation of application No. PCT/JP2015/062639, filed on Apr. 27, 2015.

(51) Int. Cl.
*G02B 7/08* (2006.01)
*G03B 3/10* (2006.01)
*G03B 5/00* (2006.01)

(52) U.S. Cl.
CPC ........ *G03B 5/00* (2013.01); *G03B 2205/0046* (2013.01); *G03B 2205/0053* (2013.01); *G03B 2217/18* (2013.01)

(58) Field of Classification Search
CPC ........ G02B 7/08; H04N 5/2252; G03B 17/02; G03B 17/06; G03B 3/02; G03B 3/10; G03B 5/00; G03B 2205/0053; G03B 2205/0046; G03B 2217/18
USPC ........ 359/823–826, 694–706, 507, 512, 513; 396/823–826, 694–706, 507, 512, 513, 396/535–541, 133, 87
See application file for complete search history.

(56) References Cited

U.S. PATENT DOCUMENTS

| | | |
|---|---|---|
| 2007/0122136 A1 | 5/2007 | Kawaguchi |
| 2010/0214678 A1 | 8/2010 | Hino et al. |
| 2011/0063742 A1 | 3/2011 | Mori |
| 2015/0077544 A1 | 3/2015 | Luscher et al. |

FOREIGN PATENT DOCUMENTS

| | | |
|---|---|---|
| JP | S62-58104 A | 3/1987 |
| JP | H03-195971 A | 8/1991 |
| JP | H04-86714 A | 3/1992 |
| JP | H04-358138 A | 12/1992 |
| JP | H05-196853 A | 8/1993 |
| JP | H05-203864 A | 8/1993 |
| JP | H09-197261 A | 7/1997 |
| JP | 2000-266984 A | 9/2000 |
| JP | 2004-354590 A | 12/2004 |
| JP | 2005-242256 A | 9/2005 |
| JP | 2006-065129 A | 3/2006 |
| JP | 2006-148635 A | 6/2006 |
| JP | 2006-178085 A | 7/2006 |
| JP | 2008-203330 A | 9/2008 |
| JP | 2008-289315 A | 11/2008 |
| JP | 2009-145706 A | 7/2009 |
| JP | 2010-139761 A | 6/2010 |
| JP | 2010-151987 A | 7/2010 |
| JP | 2011-033811 A | 2/2011 |
| WO | 2013/153005 A1 | 10/2013 |

OTHER PUBLICATIONS

International Preliminary Report on Patentability issued in PCT/JP2015/062639; dated Apr. 5, 2016.

\* cited by examiner

LENS DEVICE

CROSS-REFERENCE TO RELATED APPLICATIONS

This application is a divisional application of U.S. application Ser. No. 15/430,140 filed on Feb. 10, 2017, which was a Continuation of PCT International Application No. PCT/JP2015/062639 filed on Apr. 27, 2015, which claims priority under 35 U.S.C. § 119(a) to Japanese Patent Application No. 2014-198243 filed Sep. 29, 2014. Each of the above application(s) is hereby expressly incorporated by reference, in its entirety, into the present application.

BACKGROUND OF THE INVENTION

1. Field of the Invention

The present invention relates to a lens device.

2. Description of the Related Art

There are many lens devices in which a built-in lens is movable in the direction of an optical axis for the change of magnification, the adjustment of a focus, and the like. In a case in which a lens is moved in the direction of an optical axis by a stepping motor, the position of the lens is detected on the basis of the number of pulses. Accordingly, there is a lens device in which a magnet is provided on the outer peripheral surface of a lens holder, a hall IC is provided on the outer peripheral surface of a lens barrel, and the initial position of a lens is detected through the detection of the magnetic flux of the magnet that is performed by the hall IC (JP1993-196853A (JP-H05-196853A)). There are a lens device that detects the position of a lens by using a resistor substrate other than a hall IC (JP2011-33811A), lens devices that detect the position of a lens by using magnetism (JP2006-178085A, JP2000-266984A, and JP2010-139761A), and a lens device that detects the position of a lens by using a photo-interrupter (JP2005-242256A).

SUMMARY OF THE INVENTION

Since the hall IC is provided on the outer peripheral surface of the lens barrel in the lens device disclosed in JP1993-196853A (JP-H05-196853A), the hall IC is exposed to the outside. For this reason, when any comes into contact with the hall element, a breakdown is caused. Since the resistor substrate and a movable contact part should come into contact with each other in the lens device disclosed in JP2011-33811A, dust and the like may enter the lens barrel. Since a hole is formed between a magnetoresistive element and a magnet for the magnetoresistive element in the lens device disclosed in JP2006-178085A, dust may enter the space of a focus moving body. Since a magnetic sensor is present in a housing in the lens device disclosed in JP2000-266984A, dust of the magnetic sensor enters the housing. Since a sheet coil is mounted in a fixed lens barrel even in the lens device disclosed in JP2010-139761A, dust may enter the fixed lens barrel. In addition, since the photo-interrupter is present in a lens barrel even in the lens device disclosed in JP2005-242256A, dust caused by the photo-interrupter may enter the lens barrel.

An object of the invention is to protect a device for detecting the position of a movable lens, which is moved in the direction of an optical axis in a lens barrel, and to prevent the entry of dust, which is caused by the device, into a space in which the movable lens is moved.

A lens device according to the invention comprises: a movable lens that is held by a lens moving frame movable relative to a lens barrel in a direction of an optical axis; a holding member that extends in the direction of the optical axis from an end portion of the lens moving frame in the direction of the optical axis; a part to be detected that is formed at the holding member; and a detecting part that is disposed in a closed storage space, detects the part to be detected through a partition wall of the storage space, and outputs a signal representing the position of the part to be detected in the direction of the optical axis.

The lens device may further comprise an extender lens that is adjacent to the movable lens in the direction of the optical axis. In this case, for example, the holding member extends from the end portion of the lens moving frame in the direction of the optical axis toward the extender lens in the direction of the optical axis.

It is preferable that the thickness of the holding member in a radial direction is smaller than the thickness of the lens moving frame in the radial direction.

It is preferable that a part of an outer wall, which forms an outer peripheral surface, of the lens barrel forms a part of walls of the storage space and a part of the walls of the storage space is mounted on the lens barrel so as to be detachable from the lens barrel.

The partition wall may be mounted on the lens barrel so as to be detachable from the lens barrel.

The part to be detected and the detecting part may face each other in a circumferential direction of the lens barrel. In this case, it is preferable that a part of the outer wall of the lens barrel, which is present in the radial direction from the part to be detected and the detecting part, is mounted on the lens barrel so as to be detachable from the lens barrel.

For example, the part to be detected includes a magnet, and the detecting part includes a hall element that detects magnetism of the magnet and outputs a signal representing the position of the magnet.

The partition wall may be transparent. In this case, the part to be detected includes a marker, and the detecting part includes a linear image sensor that images the marker and outputs a signal representing the position of the marker.

In a case in which the partition wall is transparent, the part to be detected includes a marker, and the detecting part includes an optical sensor that applies light to the marker, receives light to be reflected, and outputs a signal representing the position of the marker.

According to the invention, a part to be detected is formed at a holding member that extends in the direction of an optical axis from an end portion of a lens moving frame in the direction of the optical axis. A detecting part is disposed in a closed storage space, detects the part to be detected through a partition wall of a storage space, and outputs a signal representing the position of the part to be detected in the direction of the optical axis. Since the detecting part is disclosed in the closed storage space, the entry of dust, which is generated from the detecting part, and the like into a space in which a movable lens is moved can be prevented. Further, since the detecting part is disposed in the closed storage space, the detecting part is protected.

DESCRIPTION OF THE PREFERRED EMBODIMENTS

Figure 1:
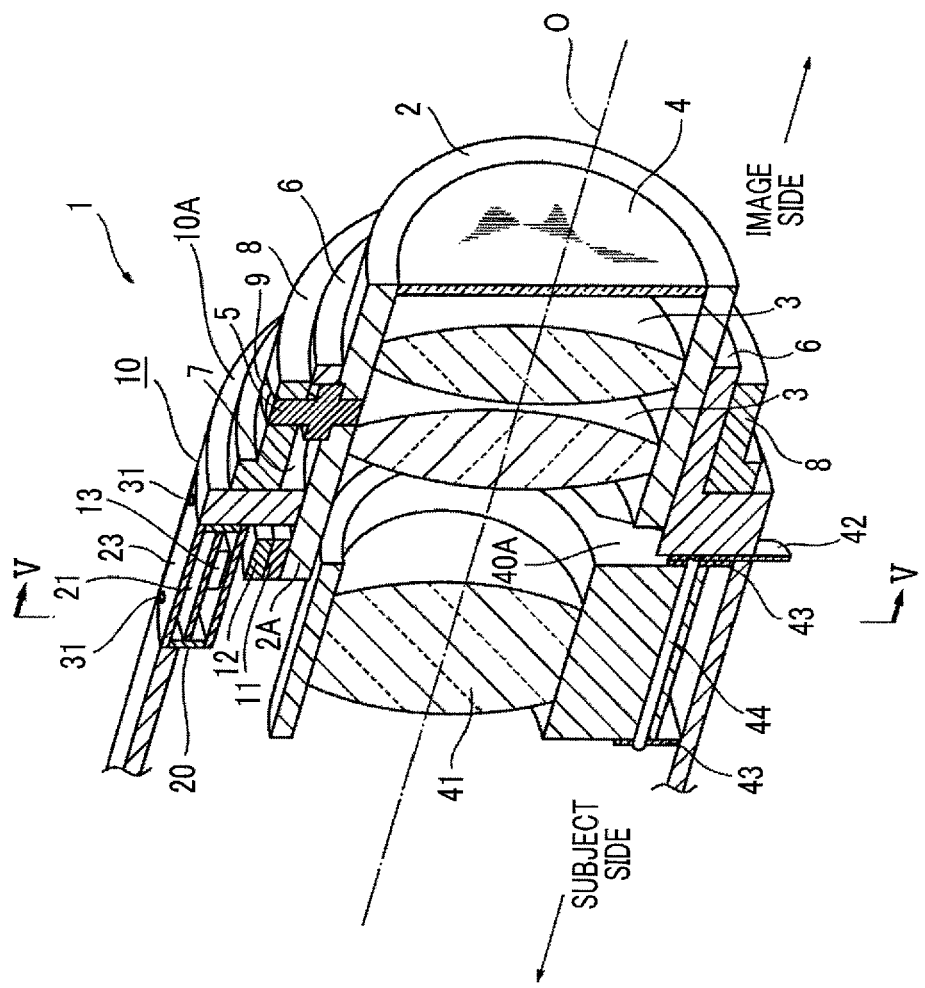
FIG. 1 is a perspective view showing the cross-section of a part of a lens device.
Figure 2:
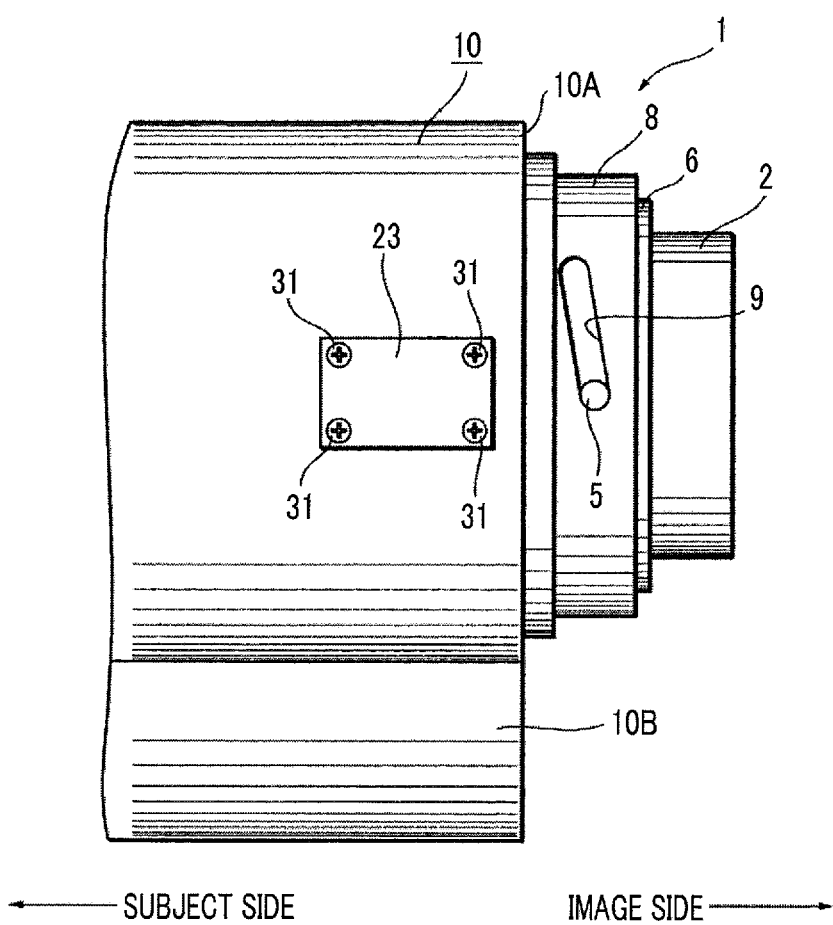
FIG. 2 is a plan view of a part of the lens device.

FIG. 1 shows an embodiment and is a perspective view showing the longitudinal section of a part of a lens device 1. FIG. 2 is a plan view of a part of the lens device 1. In FIGS. 1 and 2, the right side is an image side and the left side is a subject side.

Referring to FIG. 1, the lens device 1 includes a movable lens (rear master lens) 3 that is held by a lens moving frame 2 movable relative to a lens barrel 10 in the direction of an optical axis O. A cover glass 4 is fixed to the image-side end face of the lens moving frame 2.

A lens holding frame 6 having the shape of a circular pipe is fixed to one end face 10A of the lens barrel 10 on the outer periphery of the lens moving frame 2 so that the lens moving frame 2 is movable. A long hole 7 is formed in the direction of the optical axis O at an upper portion of the lens holding frame 6.

A rotating ring 8 is provided on the outer periphery of the lens holding frame 6. As shown in FIG. 2, a cam groove 9 is formed at an upper portion of the rotating ring 8.

A cam pin 5 is inserted into the cam groove 9 formed at the rotating ring 8 and the long hole 7 formed at the lens holding frame 6. One end portion of the cam pin 5 is fixed to the lens moving frame 2. When the rotating ring 8 is rotated about the optical axis O, the lens moving frame 2 is moved in the direction of the optical axis O.

Figure 3:
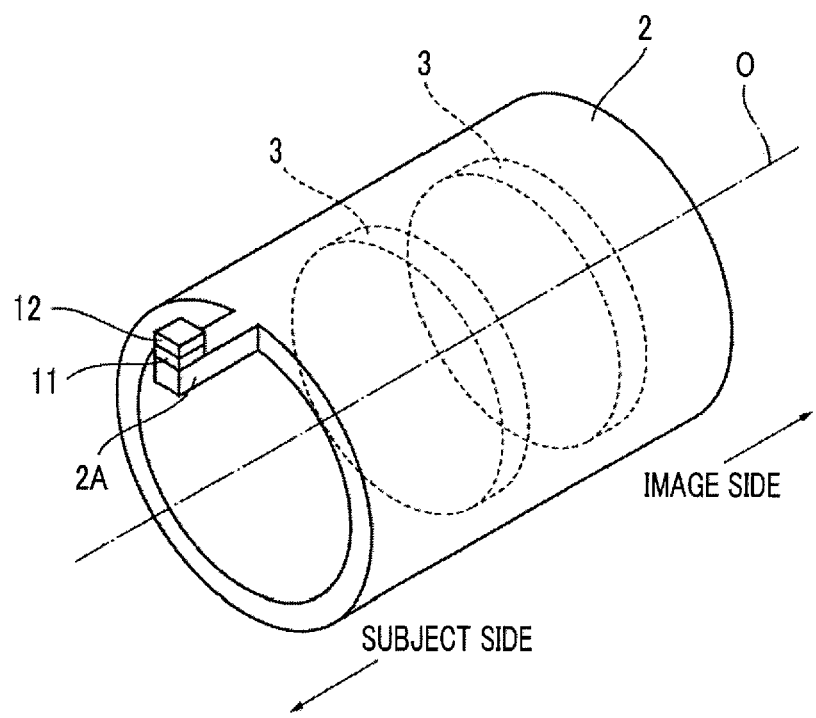
FIG. 3 shows a lens moving frame.

FIG. 3 is a perspective view of the lens moving frame 2.

Referring to FIGS. 1 and 3, a holding member 2A, which extends in the direction of the optical axis O, is formed at an upper portion of an end portion (subject-side end face) of the lens moving frame 2. The cross-section of the holding member 2A is formed in a shape (rectangular shape) different from the shape of an end face, which has the shape of a circular pipe, of the lens moving frame 2. However, the cross-section of the holding member 2A does not necessarily need to have a rectangular shape, and may have a circular shape or an elliptical shape.

A magnet (a part to be detected) 12 is fixed to (formed at) an upper portion of an end portion of the holding member 2A by an adhesive 11.

A storage box 20 is mounted on the lens barrel 10 above the magnet 12.

Figure 4:
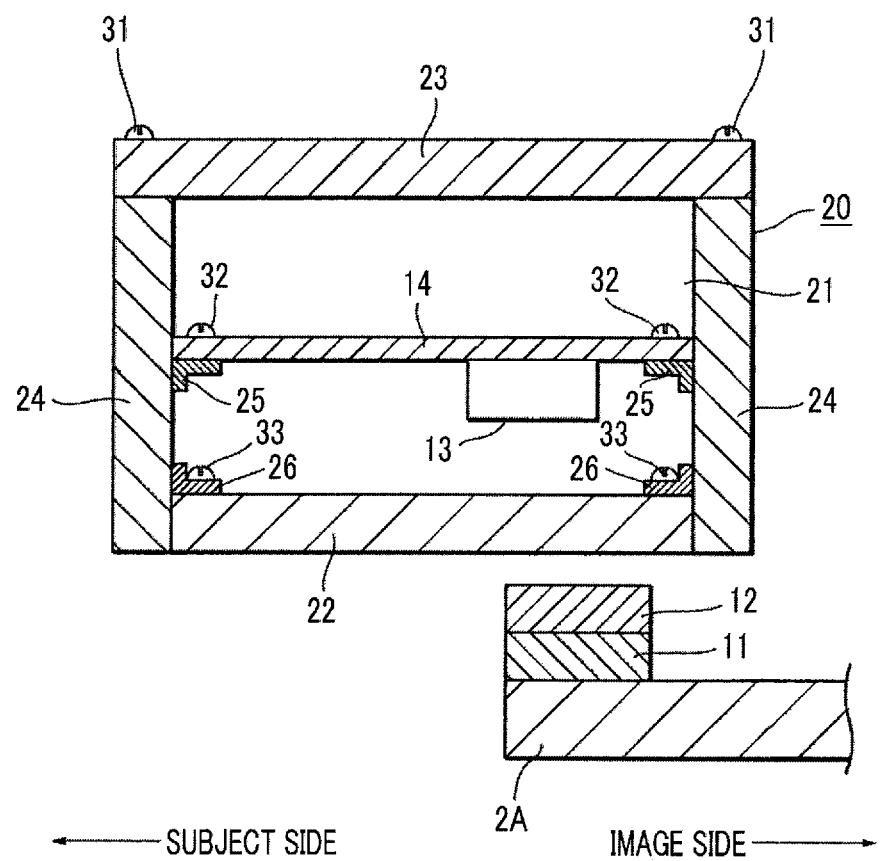
FIG. 4 is a cross-sectional view of a storage box.

FIG. 4 is a cross-sectional view of the storage box 20.

A hall IC (detecting part) 13 is disposed in a storage space 21 that is formed in the storage box 20. Magnetic flux of the magnet 12 is detected by the hall IC 13, and a signal corresponding to the magnetic flux is output from the hall IC.

Mounting members 26 are fixed to lower portions of side walls 24 that are provided on both sides of the storage box 20. A partition wall 22, which is provided on the bottom of the storage box 20, is fixed to the mounting members 26 by screws 33, so that the partition wall 22 is fixed to the side walls 24. Mounting members 25 are also fixed to inner surfaces of middle portions of the side walls 24. A substrate 14, which is fixed to the mounting members 25 by screws 32 and to which the hall IC 13 is fixed, is fixed to the side walls 24. An upper portion of the storage box 20 is an openable wall 23. The openable wall 23 is fixed to the side walls 24 by screws 31.

Referring to FIGS. 1 and 2, the openable wall 23 of the storage box 20 forms a part of the outer wall of the lens barrel 10. That is, a part of the outer wall, which forms an outer peripheral surface, of the lens barrel 10, forms a part of the walls of the storage space 21. Since the openable wall 23 is fixed by the screws 31, the lens barrel 10 is detachable from the lens barrel 10. A part of the walls of the storage space is mounted on the lens barrel 10 so as to be detachable from the lens barrel 10.

Further, since the substrate 14, which is electrically connected to the hall IC, is fixed to the side walls 24 by the screws 32 and the partition wall 22 is fixed to the side walls 24 by the screws 33, the hall IC 13, the substrate 14, and the partition wall 22 can be separated from the storage box 20 and the lens barrel 10 when the screws 32 and 33 are separated. As described above, the partition wall 22 is mounted on the lens barrel 10 so as to be detachable from the lens barrel 10.

Referring to FIG. 1, an extender lens 41 is disposed adjacent to the movable lens 3 in the direction of the optical axis O. The extender lens 41 is held by an extender lens frame 40. The holding member 2A extends toward the extender lens 41 from an end portion of the lens moving frame 2 in the direction of the optical axis O. However, the holding member 2A may extend in the direction of the optical axis O (toward the image side) from an end portion of the lens moving frame 2 opposite to the extender lens 41. Even in this case, the storage box 20 is formed so that the hall IC 13 is positioned at a position facing the magnet 12 provided on the holding member 2A.

Figure 5:
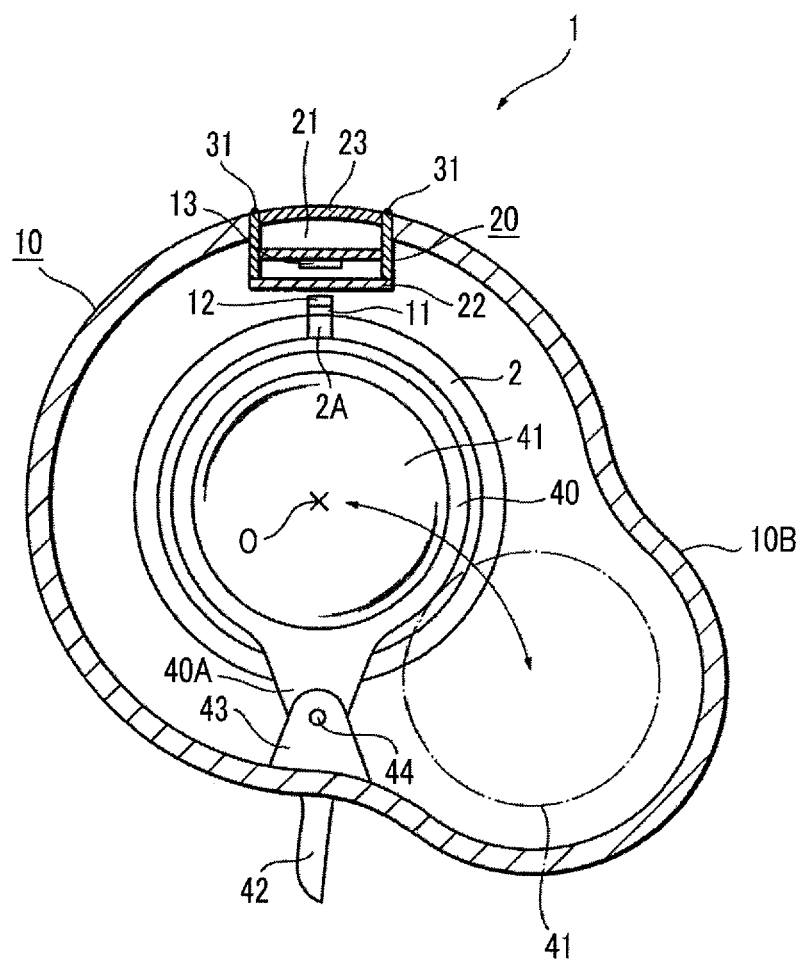
FIG. 5 is a cross-sectional view taken along line V-V of FIG. 1.

FIG. 5 is a cross-sectional view taken along line V-V of FIG. 1.

Referring to FIGS. 1 and 5, the extender lens frame 40 has a cylindrical shape and a support member 40A, which protrudes downward, is formed at the lower portion of the outer peripheral surface of the extender lens frame 40. A rotating shaft 44, which is fixed to the support member 40A, is inserted to the support member 40A in the direction of the optical axis O. Mounting members 43, which protrude toward the optical axis O of the lens barrel 10, are formed at the lower portion of the inner peripheral surface of the lens barrel 10. Both ends of the rotating shaft 44 are rotatably inserted into the mounting members 43. One end portion of the rotating shaft 44, which faces the image side, is inserted into the mounting member 43 and is fixed to one end portion of a lever 42. The other end portion of the lever 42 is exposed to the outside through the lens barrel 10 (the lens barrel 10 is provided with an opening so that the other end portion of the lever 42 is exposed to the outside of the lens barrel 10. However, one end portion of the rotating shaft 44 may extend toward the image side so as to be exposed to the outside of the lens barrel 10 from the end face of the lens barrel 10, and the lever 42 may be fixed to one end portion of the rotating shaft 44).

A retreat portion 10B, which protrudes rightward, downward, and outward toward the image side from the subject side, is formed at the lens barrel 10. When a user pulls the lever 42 (when a user pulls the lever 42 to the left side in FIG. 5), the extender lens 41, which is positioned on the optical axis O, retreats to a retreat portion 10B from the optical axis O as shown by a one-dot chain line. When the lever 42 is pushed (when the lever 42 is pushed down to the right side in FIG. 5) in a state in which the extender lens 41 has retreated to the retreat portion 10B, the extender lens 41, which has retreated from the optical axis O, is positioned on the optical axis O.

Mainly referring to FIGS. 1 and 2, the movable lens 3 is moved in the direction of the optical axis O when the rotating ring 8 is moved by a user.

Figure 6:
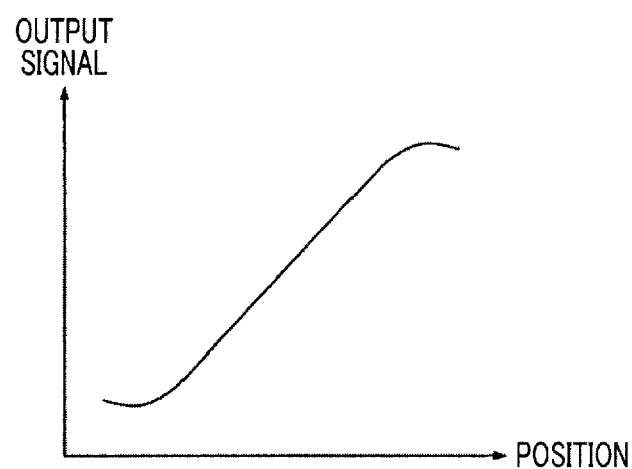
FIG. 6 shows a relationship between an output signal of a hall element and the position of a magnet.

FIG. 6 shows a relationship between the position of the magnet 12 in the direction of the optical axis O and a signal that is output from the hall IC 13.

When the magnet 12 is moved in the direction of the optical axis O, the amount of magnetic flux of the magnet 12 detected by the hall IC 13 is changed. Since a signal, which has a level corresponding to the amount of magnetic flux, is output from the hall IC 13, the position of the magnet 12 in the direction of the optical axis O, that is, the position of the movable lens 3 in the direction of the optical axis O can be detected on the basis of the output signal of the hall IC. In this way, a signal, which represents the position of the magnet 12 in the direction of the optical axis O, is output from the hall IC (detecting part) 13 that is disposed in the closed storage space 21 and detects the magnet (part to be detected) 12 through the partition wall 22 of the storage space 21.

Figure 7:
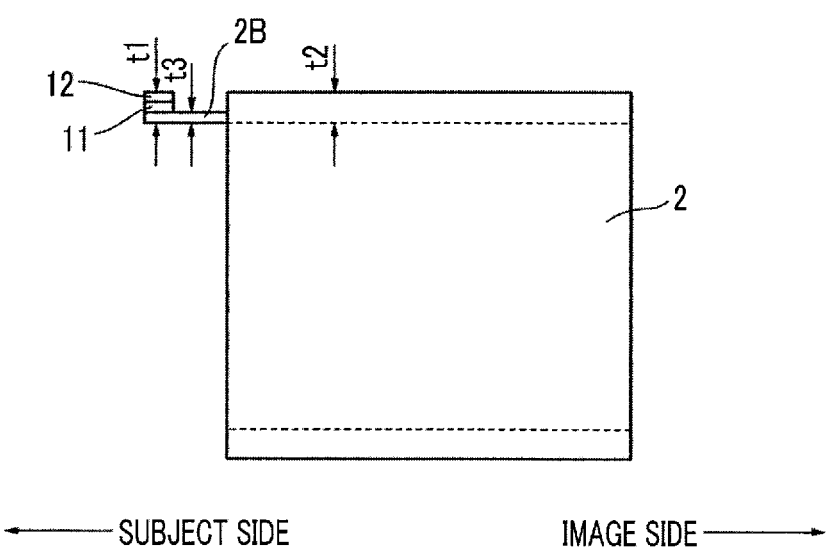
FIG. 7 shows the lens moving frame.

FIG. 7 shows a modification example and is a side view of the lens moving frame 2.

In this modification example, the total thickness t1 of a holding member 2B, which extends from an end face of the lens moving frame 2, the adhesive 11, and the magnet 12 is set to be equal to or smaller than the thickness t2 of the wall of the lens moving frame 2. Accordingly, even in a case in which the extender lens frame 40 and the holding member 2B are present in the same plane that has a normal on the optical axis O, an increase in the diameter of the lens barrel 10 is prevented. The thickness t3 of the holding member 2B in the radial direction may be merely set to be smaller than the thickness t2 of the lens moving frame 2 in the radial direction.

Figure 8:
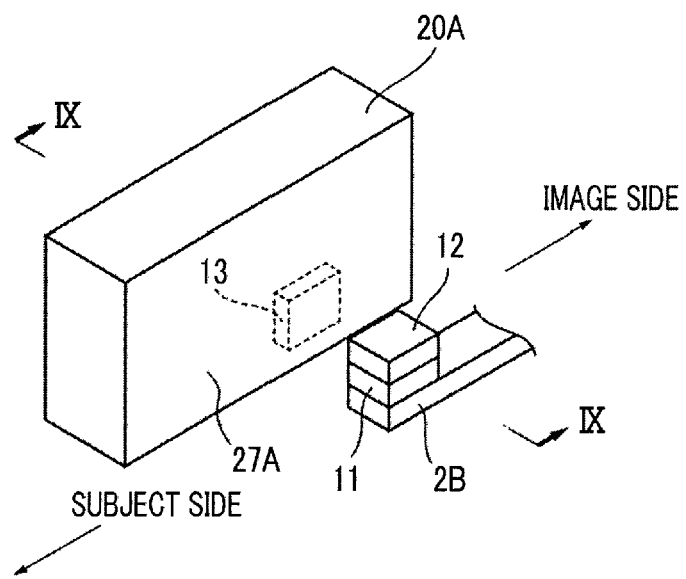
FIG. 8 is a perspective view showing a relationship between the storage box and the magnet.
Figure 9:
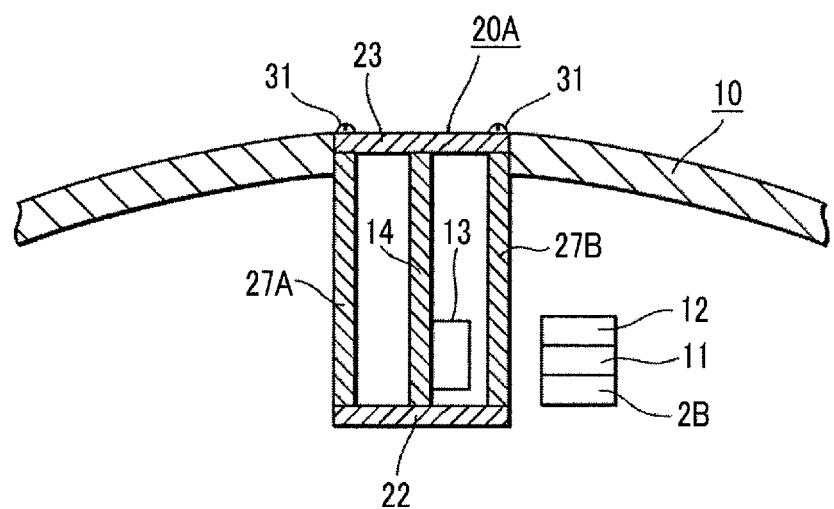
FIG. 9 is a cross-sectional view taken along line IX-IX of FIG. 8.

FIGS. 8 and 9 show another modification example.

FIG. 8 is a perspective view of a storage box 20A and a holding member 2B, and FIG. 9 is a cross-sectional view taken along line IX-IX of FIG. 8.

The magnet 12 provided on a holding member 2B and the hall IC 13 disposed in the storage space 21 of the storage box 20A face each other in the circumferential direction of the lens barrel 10 with a partition wall 27A of the storage box 20A interposed therebetween.

Mainly referring to FIG. 9, a substrate 14 is fixed in the radial direction in the storage box 20A and the hall IC 13 fixed to the substrate 14 and the magnet 12 face each other with one side wall (partition wall) 27A interposed therebetween. The storage box 20A is closed by one side wall 27A, the other side wall 27B, the partition wall 22 that is provided on the bottom, the openable wall 23 that is provided on the upper surface, and the like.

The openable wall 23 serves as a part of the outer wall of the lens barrel that is present in the radial direction from the magnet (part to be detected) 12 and the hall IC 13 (detecting part). The openable wall 23 is fixed to the side walls 27A and 27B by screws 31. When the screws 31 are separated, the openable wall 23 is separated from the lens barrel 10. In this way, the openable wall 23 serves as a part of the outer wall of the lens barrel 10, and is mounted on the lens barrel 10 so as to be detachable from the lens barrel 10.

Figure 10:
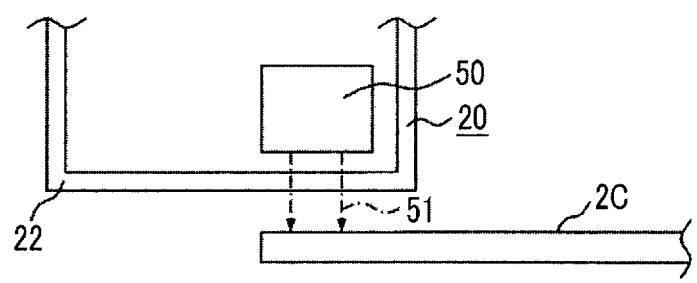
FIG. 10 shows a relationship between an optical sensor and a holding member.
Figure 11:
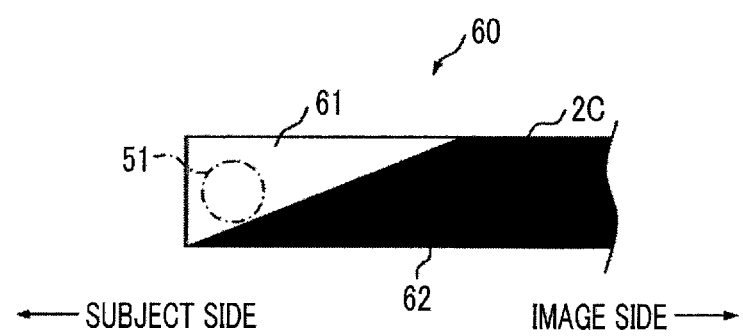
FIG. 11 shows a marker formed on the holding member.

FIGS. 10 and 11 show still another modification example, FIG. 10 is a side view, and FIG. 11 is a plan view.

Referring to FIG. 10, an optical sensor 50 is disposed in the storage box 20. Since the partition wall 22 of the storage box 20 is transparent, light 51, which is emitted from the optical sensor 50, is applied to an end portion of a holding member 2C through the partition wall 22.

Referring to FIG. 11, a marker 60 is formed at an end portion of the holding member 2C. The marker 60 includes a white portion 61 of which the width is gradually reduced toward the image side from the subject side and a black portion 62 of which the width is gradually increased toward the image side from the subject side.

Light 51 emitted from the optical sensor 50 is applied to the marker 60, and the optical sensor 50 receives light reflected from the marker 60. When much emitted light 51 is applied to the white portion 61, the amount of light to be reflected is increased. However, when much emitted light 51 is applied to the black portion 62, the amount of light to be reflected is reduced. Since a ratio of emitted light 51 to be applied to the white portion 61 and a ratio of emitted light 51 to be applied to the black portion 62 are changed according to the position of the holding member 2C in the direction of the optical axis O, the amount of light to be reflected is also changed. A signal, which represents the position of the marker 60, is output from the optical sensor 50 according to the amount of light to be reflected.

Figure 12:
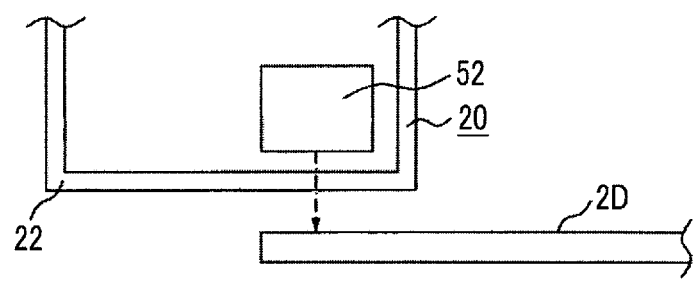
FIG. 12 shows a relationship between a linear image sensor and the holding member.
Figure 13:
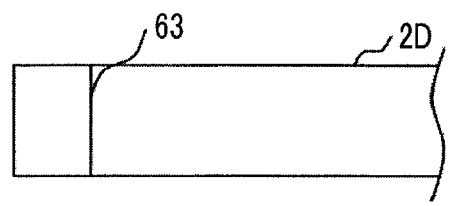
FIG. 13 shows the marker formed on the holding member.

FIGS. 12 and 13 show yet another modification example.

Referring to FIG. 12, a linear image sensor 52 is disposed in the storage box 20. Since a partition wall 22 of the storage box 20 is also transparent, an end portion of a holding member 2D is imaged through the partition wall 22 by the linear image sensor 52.

Referring to FIG. 13, a marker 63 is formed at the end portion of the holding member 2D. The marker 63 is imaged by the linear image sensor 52, and a signal representing the position of the marker 63 is output from the linear image sensor 52.

Since the position of the marker 60 or 63 is associated with the position of the movable lens 3, the position of the movable lens 3 is detected by the detection of the position of the marker 60 or 63.

The holding members 2A, 2B, 2C, and 2D extend in the direction of the optical axis O so as to be parallel to the optical axis O in the above-mentioned embodiment, but do not need to be parallel to the optical axis O. As long as the holding members 2A, 2B, 2C, and 2D extend from the end portion of the lens moving frame 2 in the direction of the optical axis O, the holding members 2A, 2B, 2C, and 2D may be obliquely formed so as to approach the optical axis O or be separated from the optical axis O.

What is claimed is:
1. A lens device comprising:
   a movable lens that is held by a lens moving frame movable relative to a lens barrel in a direction of an optical axis;

a holding member that extends in the direction of the optical axis by protruding from an end portion of the lens moving frame in the direction of the optical axis;

a part to be detected that is formed at the holding member;

a storage box positioned on and entirely supported by the lens barrel and extending from the lens barrel to protrude inwardly from the lens barrel, the storage box being partitioned off from a space where the lens moving frame moves, the storage box including a wall attached to the lens device to partition the storage box from locations external to the lens device, the wall having a surface that forms a part of an outer wall of the lens barrel; and a detecting part that is disposed in the storage box;

wherein the storage box is formed separately from the lens barrel.

2. The lens device according to claim 1, further comprising:

an extender lens that is adjacent to the movable lens in the direction of the optical axis, wherein the holding member extends from the end portion of the lens moving frame in the direction of the optical axis toward the extender lens in the direction of the optical axis.

3. The lens device according to claim 1, wherein the thickness of the holding member in a radial direction is smaller than the thickness of the lens moving frame in the radial direction.

4. The lens device according to claim 1, wherein the storage box includes a plurality of walls, and a part of the plurality of walls of the storage space is mounted on the lens barrel so as to be detachable from the lens barrel.

5. The lens device according to claim 1, wherein a partition wall of the storage box is mounted on the lens barrel so as to be detachable from the lens barrel.

6. The lens device according to claim 1, wherein the part to be detected and the detecting part face each other in a circumferential direction of the lens barrel, and a part of the outer wall of the lens barrel, which is present in the radial direction from the part to be detected and the detecting part, is mounted on the lens barrel so as to be detachable from the lens barrel.

7. The lens device according to claim 1, wherein the part to be detected includes a magnet, and the detecting part includes a hall element.

8. The lens device according to claim 1, including a partition wall attached to the storage box, wherein the partition wall is transparent, and the part to be detected includes a marker, and the detecting part includes a linear image sensor.

9. The lens device according to claim 1, including a partition wall attached to the storage box, wherein the partition wall is transparent, and the part to be detected includes a marker, and the detecting part includes an optical sensor that applies light to the marker.

10. The lens device according to claim 1, wherein the detecting part detects the part to be detected through a partition wall of the storage box, and outputs a signal representing the position of the part to be detected in the direction of the optical axis.

11. The lens device according to claim 7, wherein the hall element detects magnetism of the magnet, and outputs a signal representing the position of the magnet.

12. The lens device according to claim 8, wherein the linear image sensor images the marker, and outputs a signal representing the position of the marker.

13. The lens device according to claim 9, wherein the optical sensor receives light to be reflected, and outputs a signal representing the position of the marker.

14. The lens device according to claim 1, wherein a storage space that is formed in the storage box is divided by a substrate to which the detecting part is fixed.

15. The lens device according to claim 14, wherein the storage box includes walls and the substrate is fixed to the walls of at least two sides of the storage box.

16. The lens device according to claim 1, wherein the storage box includes a plurality of side walls, and at least two of the plurality of side walls extend from an interior of the lens barrel into an opening formed in the lens barrel.

* * * * *